United States Patent
Benson et al.

(10) Patent No.: US 6,287,670 B1
(45) Date of Patent: Sep. 11, 2001

(54) CUBE CORNER CAVITY BASED RETROREFLECTORS AND METHODS FOR MAKING SAME

(75) Inventors: Gerald M. Benson, Woodbury; Kenneth L. Smith, White Bear Lake; James C. Coderre, Lake Elmo, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/227,963

(22) Filed: Jan. 11, 1999

(51) Int. Cl.$^7$ ................................ B32B 3/00; G02B 5/122

(52) U.S. Cl. ...................... 428/172; 428/148; 428/209; 359/529; 359/530

(58) Field of Search ................................. 428/192, 172, 428/141, 148, 161, 164, 913, 156, 209, 131, 137; 359/529, 530

(56) References Cited

U.S. PATENT DOCUMENTS

| | | | |
|---|---|---|---|
| 1,950,560 | 3/1934 | Martinek et al. | 88/1 |
| 2,380,447 | * 7/1945 | Jungersen | 359/547 |
| 3,396,639 | 8/1968 | Lemelson | 94/1.5 |
| 3,684,348 | 8/1972 | Rowland | 350/103 |
| 3,689,346 | 9/1972 | Rowland | 156/245 |
| 3,712,706 | 1/1973 | Stamm | 350/103 |
| 3,716,445 | 2/1973 | Lemelson | 161/2 |
| 3,810,804 | 5/1974 | Rowland | 156/245 |
| 3,935,359 | 1/1976 | Rowland | 428/172 |
| 4,127,693 | 11/1978 | Lemelson | 428/163 |
| 4,177,505 | 12/1979 | Carel | 362/309 |
| 4,407,871 | 10/1983 | Eisfeller | 428/31 |
| 4,431,711 | 2/1984 | Eisfeller | 428/31 |
| 4,489,107 | 12/1984 | Pech | 427/162 |
| 4,498,733 | 2/1985 | Flanagan | 350/102 |
| 4,588,258 | 5/1986 | Hoopman | 350/103 |
| 4,656,072 | 4/1987 | Coburn, Jr. et al. | 428/40 |
| 4,703,999 | 11/1987 | Benson | 350/103 |
| 4,713,143 | 12/1987 | Eisfeller | 156/655 |
| 4,775,219 | 10/1988 | Appledorn et al. | 350/103 |
| 5,122,902 | 6/1992 | Benson | 359/529 |
| 5,156,863 | 10/1992 | Pricone et al. | 425/363 |
| 5,189,553 | 2/1993 | Smith | 359/530 |

(List continued on next page.)

FOREIGN PATENT DOCUMENTS

| | | |
|---|---|---|
| 0 390 344 A2 | 10/1990 | (EP) . |
| 06811 | 7/1989 | (WO) . |
| WO 93/05434 | 3/1993 | (WO) . |
| 11464 | 4/1995 | (WO) . |
| 05509 | 2/1997 | (WO) . |
| 12581 | 3/1998 | (WO) . |
| WO 98/59266 | 12/1998 | (WO) . |

* cited by examiner

Primary Examiner—Donald J. Loney
(74) Attorney, Agent, or Firm—Rudolph P. Hofmann, Jr.

(57) ABSTRACT

Retroreflective sheeting includes a body layer having a structured surface with recessed faces and top surfaces, the recessed faces forming cube corner cavities. The recessed faces have a high specular reflectivity, while the top surfaces have a low specular reflectivity. In some embodiments a substantially continuous film of reflective material covers the structured surface, and a masking substance is provided over the reflective material at the top surfaces. Alternatively, the top surfaces are given a non-smooth surface finish so that the film of reflective material on those portions has a diffuse reflectivity. In other embodiments the film of reflective material is discontinuous, disposed selectively on the recessed faces and not on the top surfaces. A cover layer is also provided, and can bond at least to the top surfaces. Keeping the top surfaces substantially free of reflective material inhibits corrosion and can enhance the bond integrity. The top surfaces are preferably flat, and diffusely reflective to enhance the daytime whiteness of the sheeting.

18 Claims, 7 Drawing Sheets

U.S. PATENT DOCUMENTS

| | | | |
|---|---|---|---|
| 5,290,625 | 3/1994 | Eisfeller et al. | 428/216 |
| 5,376,431 | 12/1994 | Rowland | 428/164 |
| 5,412,187 | 5/1995 | Walters et al. | 219/728 |
| 5,450,235 | 9/1995 | Smith et al. | 359/529 |
| 5,557,836 * | 9/1996 | Smith et al. | 29/527.4 |
| 5,583,767 | 12/1996 | Ehlig et al. | 364/423.098 |
| 5,657,162 | 8/1997 | Nilsen et al. | 359/530 |
| 5,691,846 | 11/1997 | Benson, Jr. et al. | 359/530 |
| 5,711,993 | 1/1998 | Lein et al. | 427/250 |
| 5,734,501 * | 3/1998 | Smith | 359/530 |
| 5,812,315 | 9/1998 | Smith et al. | 359/529 |
| 5,822,121 | 10/1998 | Smith et al. | 359/530 |
| 5,831,767 | 11/1998 | Benson et al. | 359/529 |

* cited by examiner

CUBE CORNER CAVITY BASED RETROREFLECTORS AND METHODS FOR MAKING SAME

CROSS REFERENCE TO RELATED APPLICATION

The present invention relates to U.S. application Ser. No. 09/228,367, "Cube Corner Cavity Based Retroreflectors With Transparent Fill Material", filed on even date herewith and incorporated by reference.

BACKGROUND

The present invention relates generally to retroreflective articles such as sheeting. More particularly, the invention relates to such articles or sheetings in which retroreflective elements comprise reflective faces arranged to form a cavity.

The reader is directed to the glossary at the end of the specification for guidance on the meaning of certain terms used herein.

Cube corner retroreflective sheetings can generally be categorized as those that use a rear-surface body layer and those that use a front-surface body layer. Commercially available cube corner retroreflective sheetings are of the former type, in which a thin transparent body layer has a substantially planar front surface and a rear structured surface comprising a plurality of geometric structures of pyramidal shape, some or all of which include three reflective faces configured as a cube corner element. Light is incident on the planar front surface, passes through the thickness of the body layer, and is retroreflected by the cube corner elements back through the front surface. In some cases, a reflective coating such as aluminum is applied to the rear structured surface, followed by an adhesive layer that covers and conforms to some extent to the shape of the structured surface. However, in general no reflective coating is required so long as a clean air interface can be maintained at the structured surface, in which case reflections occur by total internal reflection.

Some known cube corner retroreflective sheeting constructions use a front-surface body layer, in which the body layer has a front structured surface. See, e.g., U.S. Pat. No. 3,712,706 (Stamm), U.S. Pat. No. 4,127,693 (Lemelson), and U.S. Pat. No. 4,656,072 (Coburn, Jr. et al.), and PCT Publication WO 89/06811 (Johnson et al.). The front structured surface comprises a plurality of reflective faces arranged to form cube corner cavities. For this reason such retroreflective sheeting is referred to herein as cube corner cavity based retroreflective sheeting. A thin metal film is commonly applied to the structured surface to enhance reflectivity of the faces. Incident light does not penetrate through the body layer but rather is reflected by the faces forming the cube corner cavities. In some embodiments a cover layer that does transmit incident light is provided on top of the structured surface to protect the cavities from dirt or other degradation, with portions of the cover layer extending into and filling in the cube corner cavities of the structured surface. In other embodiments a cover layer is sealed or adhered to the structured surface by a colored pressure-or heat-sensitive adhesive that cancels, removes, or obliterates retroreflectivity of the structured surface.

Some structured surface geometries define both cube corner pyramids and cube corner cavities. An example is a structured surface that has a plurality of contiguous square faces, each being oriented mutually perpendicular to its adjacent faces, and each group of three adjacent faces having a hexagonal outline in top plan view.

Cube corner retroreflective sheeting is commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming, chemical vapor deposition, or physical vapor deposition to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, laminate techniques, and direct machining techniques. Each of these techniques has its own benefits and limitations.

Several advantages can be realized by fabricating cube corner cavity based retroreflective sheeting. One advantage is the ability to use a much wider variety of material compositions for the body layer than is otherwise possible. This is because the body layer need not be optically clear—in fact it can even be opaque—unlike rear-surface body layer constructions. Another advantage is the ability to form certain types of structured surfaces in the body layer more rapidly than it takes to form a negative copy of such structured surfaces in rear-surface body layer constructions. This is because molds used to form the structured surface of a front-surface body layer can have grooves that are essentially unbounded in the direction of the groove. In contrast, molds used to form the structured surface of a rear-surface body layer typically have an array of closed (cube corner) cavities bounded by a plurality of inverted grooves, i.e., ridges. The unbounded grooves of the former molds are easier to fill with body layer material than the array of closed cavities provided on the latter molds.

Cube corner cavity based retroreflective sheeting, however, also has certain drawbacks. One of these is the grayish appearance, known as gray-cast, of the sheeting when an aluminum vapor coat is used as the reflective film on the cavity faces. Gray-cast is disadvantageous in signing applications because of its effect on perceived color of the sign, most notably the reduction of daytime whiteness. This problem can be alleviated somewhat by substituting higher reflectivity materials, such as silver, in place of aluminum. A second drawback is corrosion or other degradation of the reflective film. Unfortunately, silver is more susceptible to degradation than is aluminum. Although a cover layer can provide a certain amount of protection, harmful agents present at exposed edges of the sheeting can migrate along the reflective film, steadily advancing into the sheeting starting from such edges.

Discontinuous vapor coats applied to the structured surface of cube corner sheeting are known (see, for example, U.S. Pat. No. 5,734,501 (Smith) and U.S. Pat. No. 5,657,162 (Nilsen et al.)). Such discontinuous coatings, however, have only been disclosed in connection with rear-surface body layer-type sheeting, and are utilized to address concerns other than those of interest here.

Retroreflective sheetings that incorporate the advantages of cube corner cavity based sheetings, while eliminating or reducing the disadvantages referred to above, would have wide applicability.

BRIEF SUMMARY

According to one aspect of the invention, retroreflective cube corner sheeting is provided with a body layer that has a structured surface comprising recessed faces and top surfaces, the recessed faces forming cube corner cavities. The recessed faces have a high specular reflectivity to permit efficient retroreflection of incident light. However, the top surfaces have a low or otherwise reduced specular reflectivity so as to provide desired optical or mechanical properties. A film of reflective material is disposed at least on the recessed faces to provide the high specular reflectivity. The film can be continuous over the structured surface, covering both the recessed faces and the top surfaces, or can be discontinuous, covering only the recessed faces and being substantially absent from the top surfaces. In several disclosed embodiments, the film is selectively exposed on the recessed faces. The top surfaces of the structured surface preferably comprise flat areas that are diffusely reflective, contributing to the whiteness of the sheeting, and that circumscribe an integral number of cube corner cavities. The diffuse reflectivity of the top surfaces can be provided by the body layer material itself, by a separate layer such as paint, or by a non-smooth surface finish. A cover layer can also be provided to protect the cube corner cavities from contamination and for improved weatherability.

Further, methods are disclosed for making a cube corner article in which a body layer having a structured surface as described above is provided, and a reflective film is formed at least on the recessed faces. The structured surface is treated to impart a low specular reflectivity selectively to the top surfaces. In some embodiments, the reflective film is applied substantially continuously to the structured surface. In such case the treating step can include: removing upper portions of the structured surface together with any reflective film thereon to form top surfaces, or modified top surfaces, that are free of any reflective material; applying a masking material such as a paint selectively to the top surfaces; or selectively roughening the top surfaces to provide a non-smooth surface finish, either by abrading the body layer itself or by abrading a mold used directly or indirectly in the production of the body layer. In other embodiments, the reflective film is applied discontinuously to the structured surface. In such case the treating step can include applying an adhesion-resistive material selectively to the top surfaces, before the reflective film is applied. The adhesive resistant material, such as an oil, keeps the subsequently applied reflective material from adhering to the treated areas.

BRIEF DESCRIPTION OF THE DRAWINGS

FIGS. 3A–C depict a sequence showing the formation of a mold capable of making a body layer having flat top surfaces, FIGS. 3D–G depict a sequence showing such a body layer and various coatings applied thereto, and FIG. 3H shows the finished body layer in combination with a protective cover layer;

Figure 1:
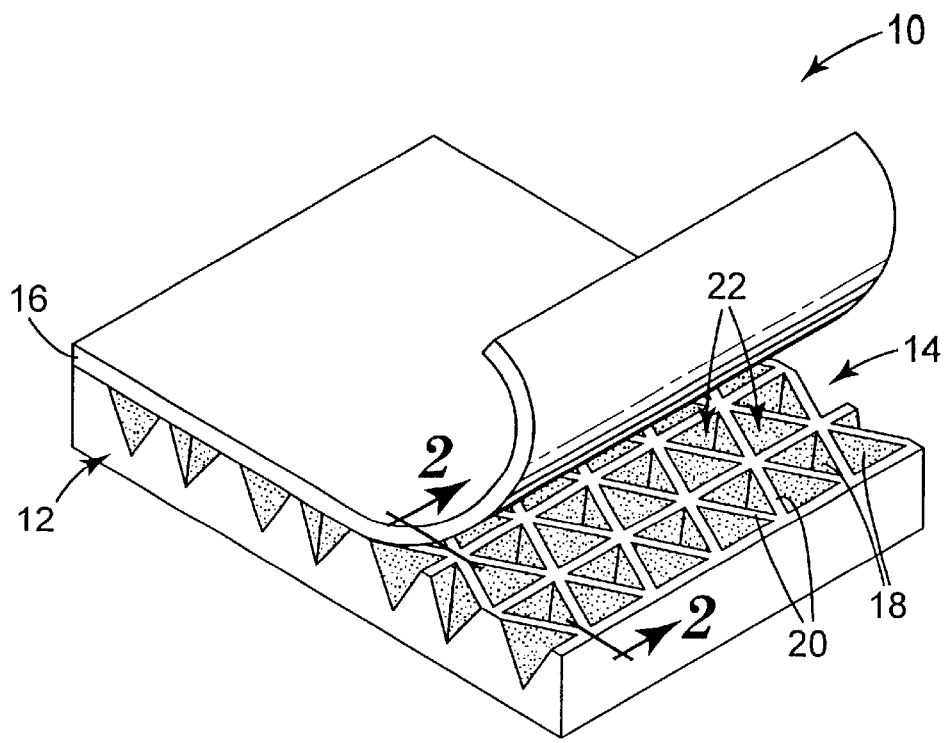
FIG. 1 is a perspective view of a retroreflector where a top cover layer thereof is shown only partially laminated to the body layer to reveal cube corner cavities formed in the body layer.

In the drawings, the same reference symbol is used for convenience to indicate elements that are the same or that perform the same or a similar function.

DETAILED DESCRIPTION OF THE ILLUSTRATIVE EMBODIMENTS

Figure 2:
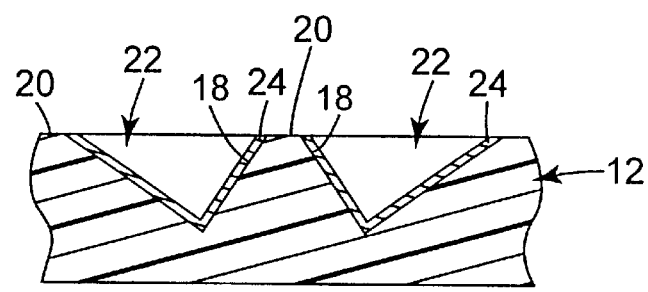
FIG. 2 is a sectional view of a portion of the body layer of FIG. 1 taken along line 2—2.

FIG. 1 a portion of a retroreflective sheeting 10 is shown enlarged. Sheeting 10 comprises a body layer 12 having a structured surface 14 and a transparent cover layer 16. Structured surface 14 includes a plurality of recessed faces 18 and top surfaces 20. The recessed faces 18, shown shaded in FIG. 1 for visual effect, form a plurality of cube corner cavities 22. The structured surface 14 can be described as consisting essentially of three intersecting sets of parallel inverted grooves, or ridges, each ridge having a flat upper surface bordered by opposed inclined recessed faces 18. Three adjacent recessed faces meet at a cavity apex and are approximately mutually perpendicular to each other. The faces can be configured as optically opposing cube corner elements as shown in FIGS. 1 and 2, where the elements can be grouped in pairs where one element is rotated 180 degrees relative to the other, although other configurations are also possible.

The cube corner elements can also have a canted configuration, wherein their optical axes or symmetry axes are tilted relative to a direction normal to the structured surface. Such canting is described for cube corner pyramids in, for example, U.S. Pat. No. 4,588,258 (Hoopman), U.S. Pat. No. 5,822,121 (Smith et al.), and U.S. Pat. No. 5,812,315 (Smith et al.). Cube corner elements in which the nondihedral edges of each cube corner element are not all coplanar (sometimes referred to as full cube corner elements or non-truncated cube corner elements) can also be used. A structured surface containing such full or non-truncated cube corner elements would not consist solely of intersecting sets of parallel ridges.

A film 24 of reflective material is provided on the recessed faces to impart a high specular reflectivity to those faces so that the cube corner cavities efficiently retroreflect incident light impinging on the article from above, i.e., through cover layer 16. Film 24 can comprise metals such as aluminum, silver, nickel, tin, copper, or gold, or can comprise non-metals such as a multilayer dielectric stack. Such films can be applied by known physical or chemical deposition techniques, such as vacuum evaporation, sputtering, chemical vapor deposition ("CVD") or plasma-enhanced CVD, electroless deposition, and the like, depending upon the type of film desired. A given film can include multiple layers, including layers that promote adhesion to the body layer, barrier layers, and protective overcoat layers. A suitable film for polycarbonate-based body layers comprises about 1 nm thick titanium dioxide layer formed by sputtering titanium onto the body layer, followed by a 100 nm thick layer of evaporated aluminum. The titanium dioxide layer acts both as an adhesion promoter and a barrier layer to counteract pinholes typically present in the aluminum vapor coat. The film 24 shown in FIG. 2 is discontinuous in that it covers substantially entirely the recessed faces 18, and is substantially absent from top surfaces 20.

Top surfaces 20 are preferably substantially flat to provide an excellent base for bonding body layer 12 to cover layer 16. Flat top surfaces can enhance surface contact with cover layer 16, or with an intermediate fill material layer, and can provide good visibility compared to a convex or concave shape, although such other shapes may be advantageous for other purposes. The flat top surfaces need not have a smooth surface finish, as discussed below. Bonding of body layer 12 to cover layer 16 can comprise conventional thermal sealing, or adhesive or other attachment layers applied to cover layer 16, top surfaces 20, or both. In some cases keeping reflective film 24 off of top surfaces 20 can make the bond between the body layer 12 and cover layer 16 more reliable since failure modes involving a bonding failure between film 24 and body layer 12, or between film 24 and cover layer 16 or an intermediate layer of fill material, are less likely. Indeed even reflective materials that have relatively poor adhesion to body layer 12 can be used with little or no negative impact on the integrity of the bond between body layer 12 and cover layer 16. Significantly, where the top surfaces 20 are interconnected and circumscribe one or several cube corner cavities, the discontinuity of film 24 provides a corrosion barrier so that corrosive or otherwise harmful agents acting along film 24 will be stopped within a short distance, preferably no more than about one or two cube corner elements, of the sheeting edge. Body and cover layers composed of compatible materials or even the same or a similar material can enhance the bond therebetween. Where the number of circumscribed cube corner cavities is only a few, preferably no more than one or two, each cube corner cavity having a characteristic aperture size of less than 1 mm and more typically on the order of about 1 to 10 mils (25 to 250 µm), the sheeting can be cut into any desired shape such as letters or symbols while maintaining good optical quality even close to the edge without having to edge seal the sheeting. In this context, the aperture size of a cube corner cavity refers to its maximum breadth in the plane of the structured surface. Dirt, water, contamination, or corrosion is unable to penetrate significantly into the sheeting due to the discontinuous nature of film 24 and the network of closely-spaced bonds between the top surfaces and the cover layer.

Top surfaces 20 can be used to enhance the daytime whiteness (referred to in the art as cap-Y) of the article by virtue of being diffusely reflective. This diffuse reflectivity can be provided by the body layer material itself, or by a masking substance applied selectively to the upper separation surfaces, discussed below. The diffuse reflectivity can also be provided by imparting a non-smooth surface finish to surfaces 20, and optionally coating the roughened portions with the reflective film 24, or with other substances. In yet another embodiment, the diffuse reflectivity can be provided by substantially transparent top surfaces 20 and body layer 12 together with a diffusely reflective rear surface of body layer 12. It is anticipated for most embodiments that the top surfaces, as seen from a top plan view of the structured surface, take up at least about 5% of the area of the structured surface.

To achieve maximum effect on whiteness, substantially all of the top surfaces of the structured surface are diffusely reflective. In other instances it may be desirable to impart diffuse reflectivity (or low specular reflectivity) to only certain areas of the top surfaces, for example, in order to define a particular pattern, symbol, or other indicia.

Figure 3A:
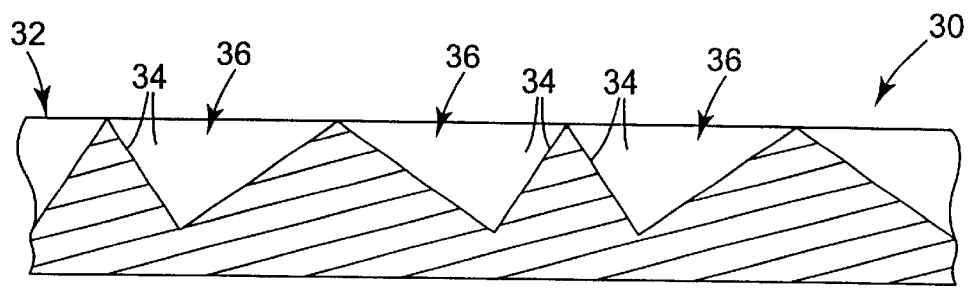
FIGS. 3A–H are a series of drawings showing the sequence of how a retroreflector such as that shown in FIG. 1 can be fabricated, where
Figure 3B:
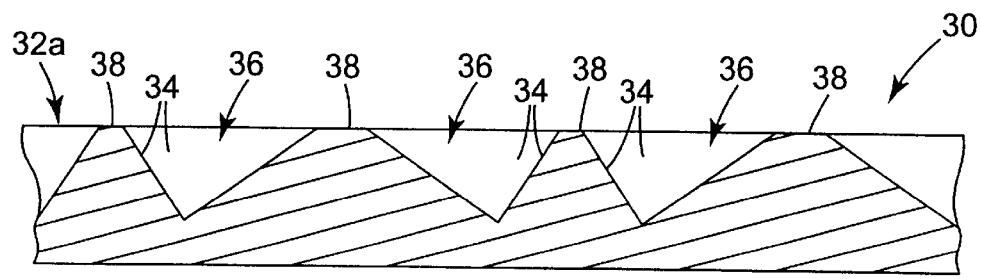
Figure 3C:
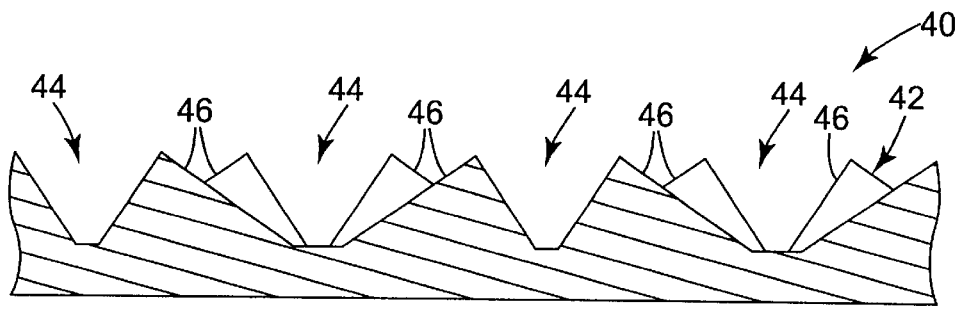

FIGS. 3A–C are sectional side views showing one way of producing a mold suitable for forming cube corner cavity-based sheeting with flat upper separation surfaces. In brief, sets of parallel grooves are formed in an initial substrate (not shown) by fly-cutting, ruling, milling, or the like to create a structured surface therein of cube corner pyramids. A replica 30 is then made by nickel electroforming or any other suitable process, the replica 30 having a structured surface 32 of inverted grooves or ridges defining recessed faces 34 that form cube corner cavities 36. The replica 30 is a negative copy of the machined initial substrate. The upper portions of structured surface 32 may or may not include top surfaces, depending on the type of tool used to scribe the initial substrate. A milling operation is then performed on the structured surface to shave off a given thickness from the top of the replica 30 to produce top surfaces 38 that are flat and circumscribe each cube corner cavity 36. In one embodiment the modified replica 30 may have a perspective view substantially the same as that of body layer 12 in FIG. 1. Another replica 40 is then made, by nickel electroforming or otherwise, of the modified structured surface 32a. Replica 40 has a structured surface 42 characterized by sets of parallel flat-bottomed grooves (one such set labeled 44) that define separate cube corner pyramids 46. Replica 40 is thus a slightly modified positive copy of the machined initial substrate.

Alternatively, structured surface 42 can be made by machining flat-bottomed grooves directly into an initially flat substrate with a flat-tipped diamond tool. An advantage of this approach is avoidance of at least two replication steps. Another advantage is additional design flexibility: grooves having different flat bottom widths can be mixed and matched to produce a non-uniform pattern of flat surfaces, and cube corner elements of varying height and aperture (see FIG. 7 below). Finally, this technique can more easily yield top surfaces having a smooth surface finish, if desired. A disadvantage is the increased number of passes of the cutting tool required if a width greater than the flat of the cutting tool is desired.

Regardless of how the structured surface 42 is prepared, it (or a positive replica thereof) is then used as a mold to produce sheeting as illustrated in the sectional views of FIGS. 3D–H.

Figure 3D:
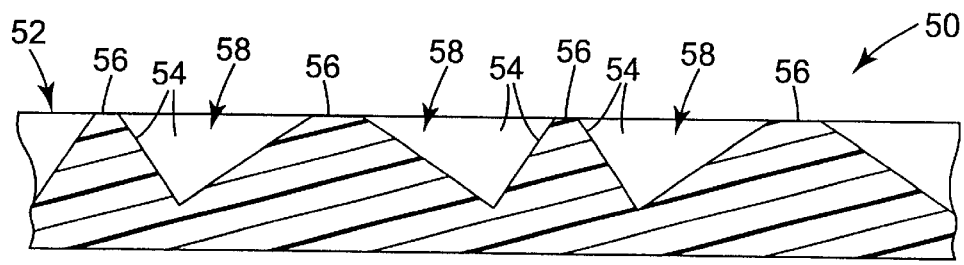

In FIG. 3D, a body layer 50 useable in a retroreflective sheeting is shown having a structured surface 52 formed by embossing, by casting a molten thermoplastic or thermoset material, or by casting-and-curing a radiation-curable material using structured surface 42. Structured surface 52 is substantially the same as surface 32a discussed above, and includes recessed faces 54 and flat top surfaces 56, the recessed faces defining cube corner cavities 58. On an embossing machine in which a drum or belt has a set of grooves such as 44 extending across its structured surface, body layer material can be more easily forced into such grooves than into closed cavities such as cube corner cavities 36 shown in FIG. 3B. This ease of replication allows for increased line speeds, and lower manufacturing costs.

Body layer 50 is shown as a unitary layer, but it may also comprise two or more distinct layers to provide enhanced mechanical flexibility or other desired properties. Since layer 50 need not be optically clear or even transparent, body layer materials are preferably selected for their ability to maintain precise cube corner faces to optical tolerances, for weatherability, for toughness, manufacturability, low cost, or other characteristics. A preferred material is polycarbonate, but other thermoplastic, thermoset, or radiation-curable materials can also be used. Additives may be used to give desired properties. For example, colorants can be used to give exposed portions of layer 50 a diffuse white or other colored appearance. Titanium dioxide is an example of a diffuse white additive. Fluorescent and/or luminescent dyes and pigments can also be used. In one embodiment, the body layer can be light transmissive and fluorescent with a white diffuse layer applied to the side opposite the structured surface 52. Light-absorbing additives can alternatively be used if a dark or black daytime appearance is desired. For retroreflective sheeting, body layer 50 is made sufficiently thin and flexible so that it can conform to a target substrate despite the presence of foreseeable imperfections or deviations from flatness.

Figure 3E:
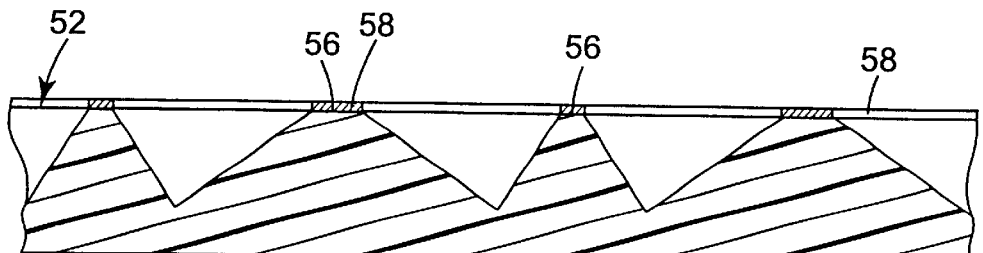
Figure 3F:
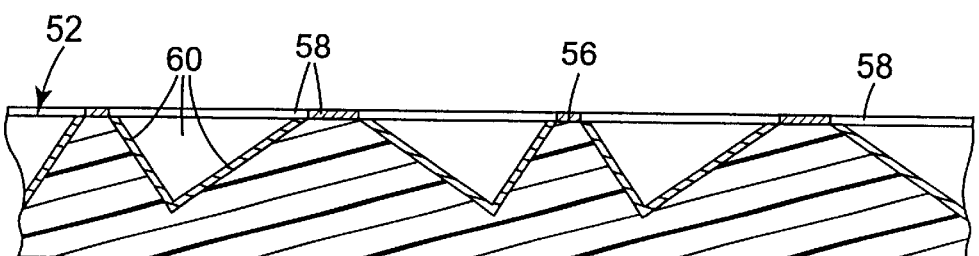
Figure 3G:
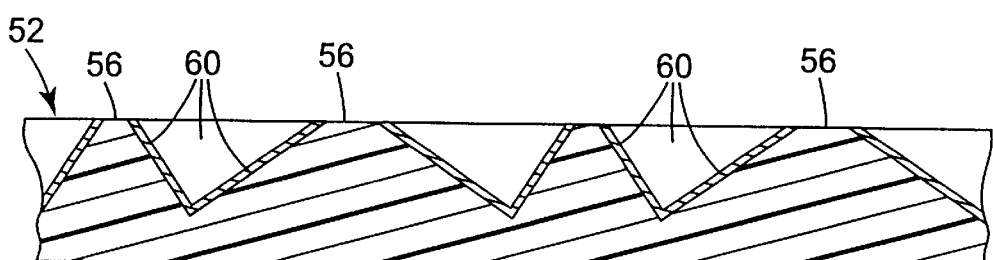

In FIG. 3E, a thin film of oil 58 has been roll-coated onto top surfaces 56 of structured surface 52. The entire structured surface is then vapor-coated with a thin film 60 of aluminum, silver, or other reflective material, as shown in FIG. 3F. Significantly, the vapor coat is unable to adhere to surfaces treated with the oil. The vapor coat therefore adheres only to untreated portions of the structured surface, namely recessed faces 54. Thus, a discontinuous reflective film 60 is formed selectively on the recessed faces 54 and is substantially absent from top surfaces 56. This is most clearly seen in FIG. 3G which depicts body layer 50 after removal of oil film 58.

In a subsequent step, a transparent cover layer 62 is laminated to body layer 50 to keep cavities 58 free of foreign substances that could detract from performance. Conventional thermal sealing techniques can be used to bond cover layer 62 directly to top surfaces 56. Alternatively, an adhesive or attachment layer can be provided as described below. Preferably, cover layer 62 comprises single or multilayer thermoplastic or thermoset polymers or combinations thereof. Acrylics, vinyl chloride, urethanes, ethylene acrylic acid copolymers, polyesters, and fluoropolymers including polyvinylidene fluoride are preferred for weatherability. Colorants, dyes, UV or other absorbers, and like additives are also contemplated. The cover layer can have graphics, symbols, or other indicia so that the sheeting formed by the combination of the body layer and cover layer conveys useful information.

Figure 3H:
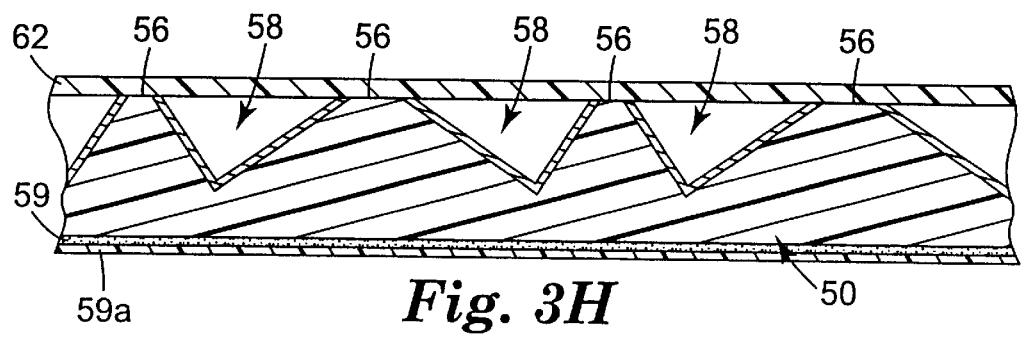

Although FIG. 3H depicts the cavities 58 as vacuum or air-filled, filling the cavities with a clear substance has the advantage of improving the entrance angularity of the sheeting. That is, light incident on the sheeting at certain high entrance angles will not be retroreflected for air-filled cavities but will be retroreflected for cavities filled with a fill material. The higher the refractive index of the fill material, the more the material refracts highly oblique incoming light rays toward the symmetry axis of a cube corner cavity, and the higher the entrance angularity of the sheeting. Preferred materials are disclosed in the co-pending U.S. application referred to above. In brief, the preferred fill materials are acrylic polymers which may be pressure-sensitive adhesives at room temperature, or heat activated adhesives which are substantially non-tacky at room temperature but become tacky at higher temperatures. The relatively low viscosity, pressure, and temperature associated with replication of typical radiation-curable materials allows for fairly easy filling of the cavities. In a preferred embodiment the fill material is an optically clear pressure-sensitive adhesive sandwiched between the body layer and the cover layer, and preferably in a continuous layer covering both the recessed faces and top surfaces. In other embodiments the cover layer can itself serve as the fill material, if shaped to extend into the cavities. A wide variety of other materials can also be used, such as suitable epoxies, hot melt adhesives, high melt index thermoplastic polymers, and radiation curable thermoset polymers. Although not preferred because of reduced retroreflectivity, constructions in which only a portion of the cavaties remain filled with a fill material are also possible.

Also shown in FIG. 3H (not to scale) is a pressure-sensitive or heat-activated adhesive 59 and a release liner 59a. These would typically be applied to the rear surface of body layer 50 to permit easy application of the sheeting to a target substrate.

Figure 4A:
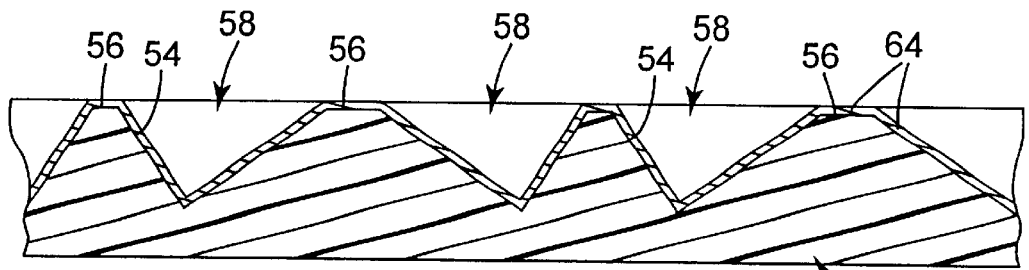
FIGS. 4A–C are a series of drawings showing a sequence that, if substituted for FIGS. 3E–H, produces an alternative embodiment from that shown in FIG. 3H.
Figure 4B:
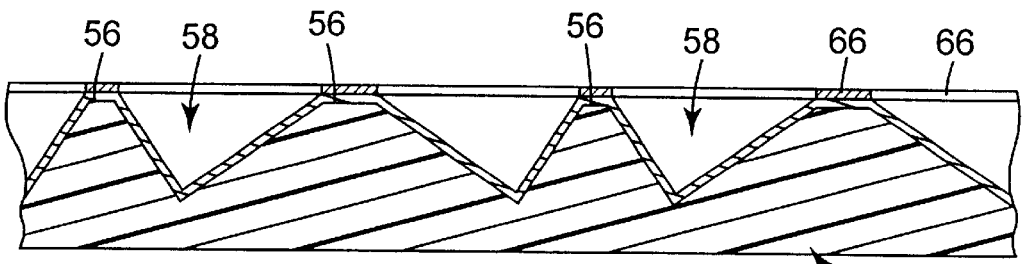
Figure 4C:
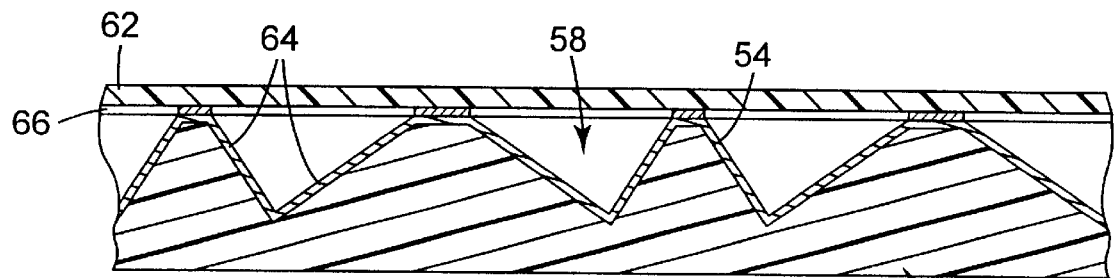

FIGS. 4A–C show an alternative embodiment sheeting utilizing a substantially continuous reflective film that remains on the structured surface. However, as with the embodiment og FIG. 3H, the top surface of the structured surface have a reduced specular reflectivity, due to the presence of a masking material such as a pigmented paint. FIG. 4A depicts body layer 50 of FIG. 3D after application of a continuous reflective film 64. Film 64 covers both recessed faces 54 and top surfaces 56. Film 64 covers both recessed faces 54 and top surfaces 56. A masking material 66 is then applied discontinuously, as shown in FIG. 4B, by roll coating, thermal transfer printing, or a similar process. Material 66 thus covers film 64 selectively at top surfaces 56, leaving the remainder of film 64 exposed. Film 64 is thus exposed selectively on the recessed faces of the structured surface of the body layer, as are films 60 (FIGS. 3G, 3H) and 24 (FIG. 2), described above. Depending on the desired characteristics of the sheeting, material 66 is selected to impart such characteristics. If it is desirable to make a retroreflective sheeting with high cap-Y, then a highly diffuse reflecting white paint is selected. It may also be desirable to make a sheeting with a daytime color or fluorescent effect that differs from the appearance in retroreflected light, in which case a colored diffuse paint or phosphor pigment is selected. It may further be desirable to make a sheeting that is retroreflective at night but inconspicuous or even dark during the day, in which case a black absorbing paint is selected. Such masking materials can also be printed on the face of the sheeting to form patterns or indicia. FIG. 4C shows the sheeting after application of cover layer 62, described previously. Fill material can occupy cavities 58 as discussed above to increase entrance angularity.

Since the top surfaces detract from the retroreflective performance of the sheeting, it is desirable in most cases to make them as small as is necessary to achieve the desired effect, and completely cover them with masking material 66. In some cases, however, such as where material 66 forms a graphical image, it may be desirable to cover less than all of the top surfaces with the masking material. Likewise, it may be desirable to remove reflective material from less than all of the top surfaces in previously discussed embodiments.

Figure 5:
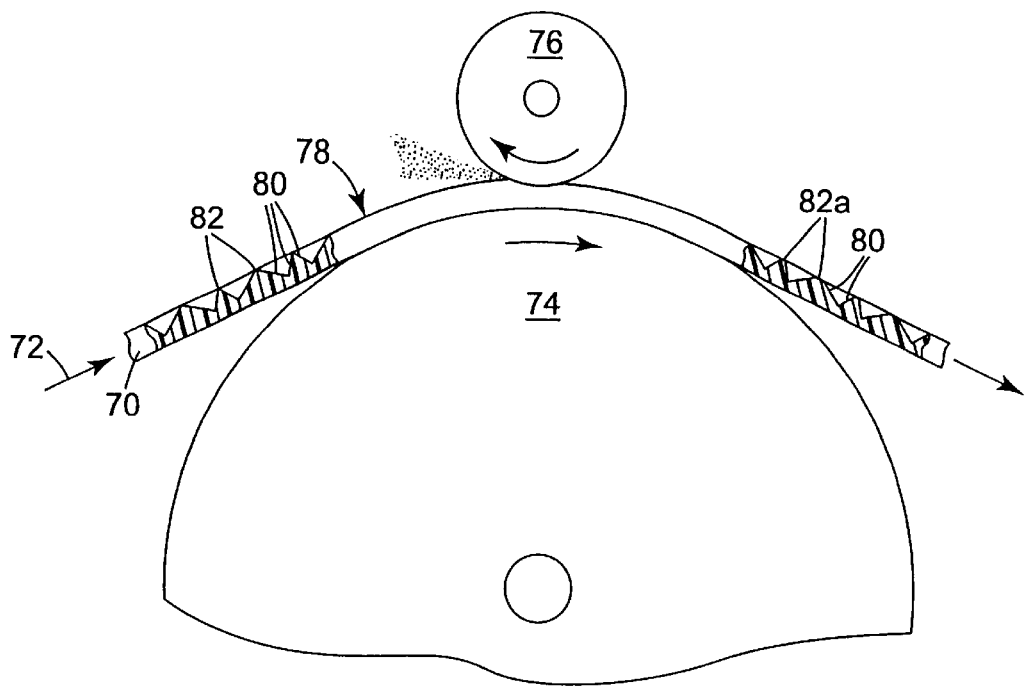
FIG. 5 depicts an alternative way to produce a cube corner cavity-based body layer with flat top surfaces and a discontinuous reflective film, using an abrasion wheel.

FIG. 5 depicts another method of producing a front-surface body layer with a discontinuous reflective film. A body layer 70 is fed along direction 72 and guided by a roller 74 rotating as shown across an abrasion wheel 76 rotating in an opposite direction. Before contacting the abrasion wheel, body layer 70 has a front structured surface 78 that includes recessed faces 80 that form cube corner cavities, and narrow top surfaces 82. The structured surface 78 could instead consist essentially of recessed faces 80, and have no top surfaces provided at its upper portions. A substantially continuous reflective film covers both the recessed faces 80 and top surfaces 82. Abrasion wheel 76 grinds off a predetermined thickness of structured surface 78, thus removing the reflective film, along with some of the body layer material, selectively from the upper portions. Debris collected in the cavities can be removed in a cleaning step. The processed body layer 70 has modified top surfaces 82a substantially free of reflective material. The reflective material is selectively exposed on the recessed faces.

The process depicted in FIG. 5 can also be used to form an initial body layer having flat top surfaces, such as body layer 50 shown in FIG. 3D. Thus, rather than constructing a specialized mold, as described in connection with FIGS. 3A–C, a more conventional mold (e.g. a simple negative copy of the surface shown in FIG. 3A) is used and the sheeting processed by bringing it in contact with the abrasion wheel. A continuous or discontinuous reflective film, as desired, can then be applied to the modified structured surface.

Figure 6A:
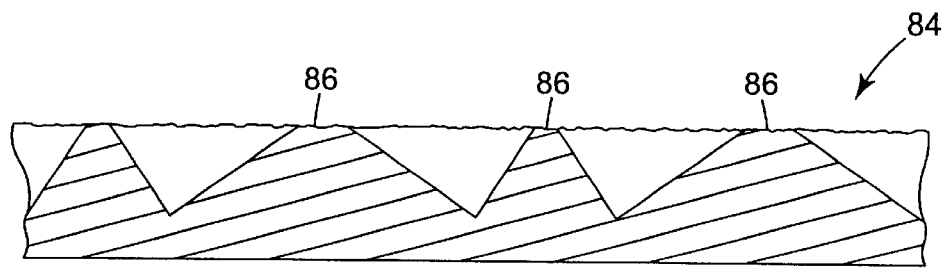
FIGS. 6A, 6B are cross-sectional views showing how a continuous reflective layer can be used in combination with a non-smooth surface finish on top surfaces of the structured surface.
Figure 6B:
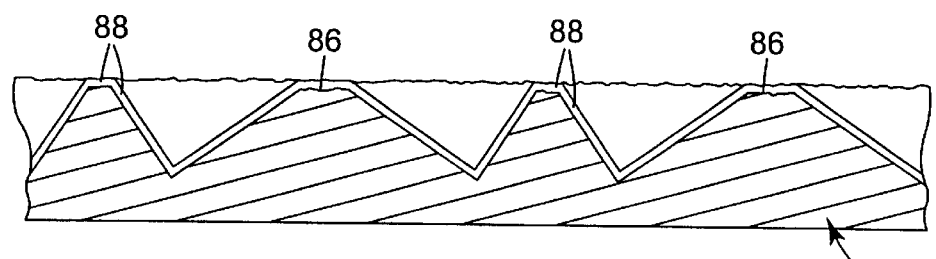

FIGS. 6A and 6B show yet another embodiment of a cube corner cavity based sheeting in which top surfaces of a structured surface are given a reduced specular reflectivity relative to the recessed cube corner faces. A polymeric body layer 84 is made in like fashion to body layer 50 of FIG. 3D, except that body layer 84 has flat top surfaces 86 treated to provide a non-smooth surface finish. The non-smooth, or roughened, surface finish can be the result of replicating the body layer using a mold that has corresponding roughened surfaces, or by roughening the selected portions of the body layer after fabrication. Roughening can be accomplished by laser ablation, chemical etching, selective abrasion, or even embossing. FIG. 6B shows how a thin reflective film 88 deposited continuously on the structured surface provides high specular reflectivity on the smooth recessed cube corner faces, but provides a more diffuse and lower specular reflectivity on the top surfaces due to the non-smooth surface finish.

The principles of FIGS. 6A and 6B can alternately be applied to cube corner retro sheetings that use a rear-surface body layer. In this case a mold having a structured surface with roughened top surfaces substantially the same as that of body layer 84 in FIG. 6A is used to emboss, cast, or otherwise form a rear-surface body layer, either directly or using a series of mold replication steps. The rear-surface body layer has a structured surface substantially the same as surface 42 in FIG. 3C, except that the flat intermediate surfaces between the cube corner elements 46 are non-smooth or roughened. A continuous film of reflective material is then applied to the body layer structured surface. The portion of the reflective film on the faces of the cube corner pyramids supports retroreflection, and the portion of the reflective film on the roughened intermediate surfaces exhibits diffuse reflectivity, resulting in enhanced perceived whiteness. An adhesive layer would then be applied to the reflective film.

An advantage of the embodiments associated with FIGS. 6A, 6B is simplicity of construction. Additional process steps and materials associated with producing a discontinuous reflective film or with selectively applying a masking material can be avoided. However, if desired, one or both of those features can be used. In either case the increased surface area of the top surfaces due to the non-smooth finish may also help in adhesion between the reflective film and the body layer, or between the body layer and the cover layer or any intermediate layer.

Figure 7:
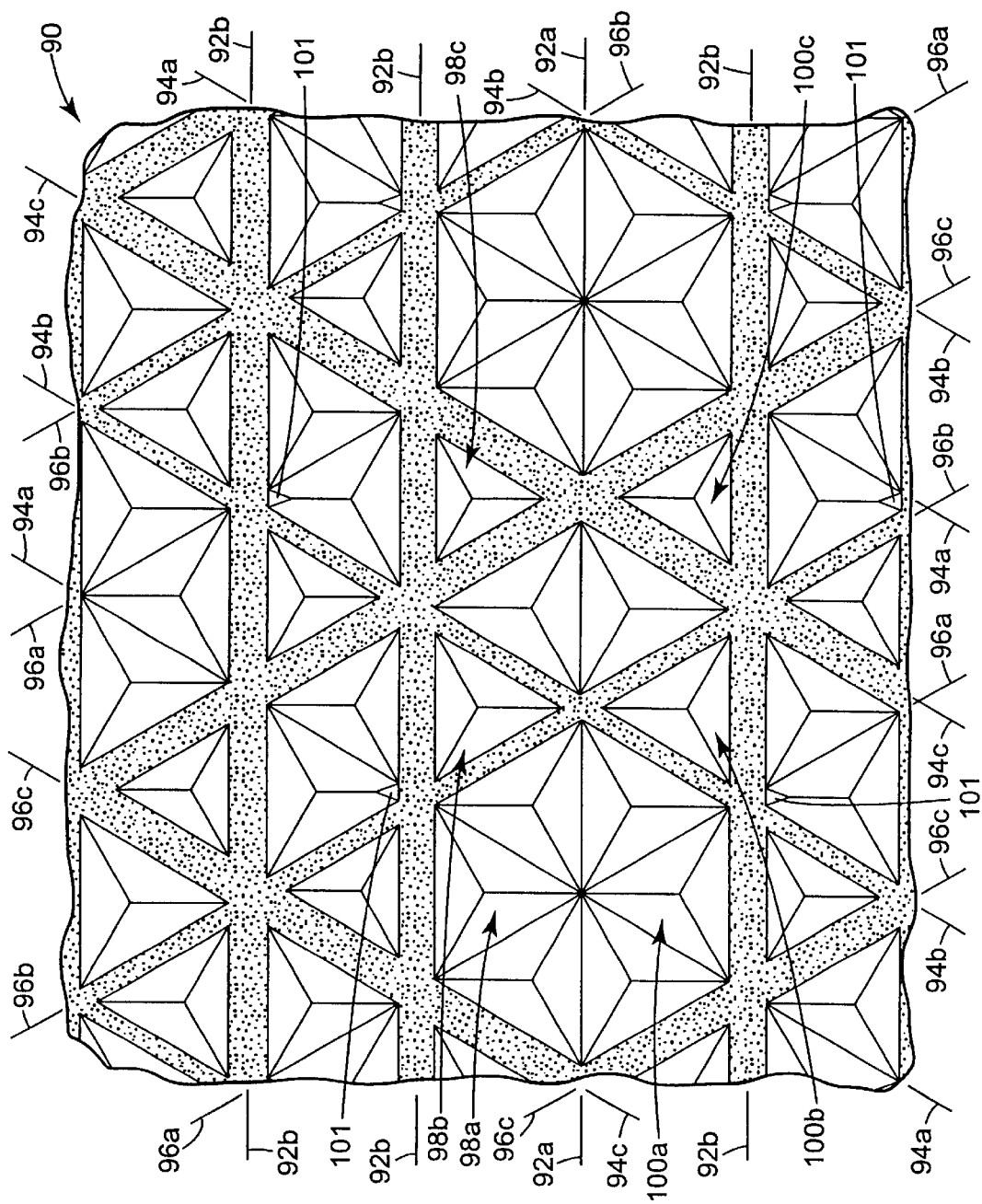
FIG. 7 is a top plan view of a portion of a structured surface for a body layer useable with the invention.

The top view of a body layer depicting another possible structured surface configuration is shown in FIG. 7. Only a portion of the repeating pattern is shown. The structured surface 90 is composed of recessed faces (shown not shaded) and upper portions including top surfaces (shown shaded) arranged to define three sets of parallel inverted grooves or ridges. Ridge set 92 includes parallel ridges 92a, 92b, ridge set 94 includes parallel ridges 94a, 94b, 94c, and ridge set 96 includes parallel ridges 96a, 96b, 96c. As shown, ridges within each ridge set have upper portions of differing transverse dimensions, i.e., of differing width as measured in the plane of the structured surface perpendicular to the axis of the ridge in question. Such a configuration is possible using a mold fabricated in accordance with the technique described above, where diamond tools (at least one of which is flat-tipped) are used to form grooves having different groove bottom widths. When the body layer is replicated from such a mold, the grooves in the mold produce ridges in the body layer. In another approach the same configuration can result from a sharp-tipped tool cutting grooves at different depths, and then making a negative copy and machining the upper portions of the structured surface to a common height. As shown, not all of the ridges are provided with top surfaces: ridges 92a, 94a, 96a have none. Nevertheless, the illustrated interconnecting network of top surfaces circumscribes individual cube corner elements and groups of one, two, three, and six elements.

The different ridge types are preferably arranged in repeating patterns to produce a variety of different cube corner cavity types. For example, the sequence of cube corner cavities 98a, 98b, 98c demonstrate a decreasing aperture size, as do optically opposed cube corner cavities 100a, 100b, 100c respectively. For cube corner cavities having an aperture size of about 0.25 mm or less, effects from diffraction begin to become noticeable. Interspersing cube corner cavities of differing aperture size on the same structured surface helps to average out those effects, producing better uniformity and a more smoothly varying divergence profile.

As shown, structured surface 90 consists essentially of recessed cube corner faces and top surfaces. Note that some of the geometric structures on surface 90 have an additional recessed face 101. The faces 101 are artifacts that arise during the cutting of the master mold because of the arrangement of the different sized cube corner elements. Faces 101 have a small or negligible effect on optical performance.

Each pair of ridge sets 92, 94, 96 mutually intersect at a 60 degree included angle, forming non-canted cube corner cavities. Arrangements where the cavities are canted are also contemplated, including the case where only one pair of the ridge sets mutually intersect at an angle less than 60 degrees, and the case where only one pair of the ridge sets mutually intersect at an angle greater than 60 degrees. Canting of the cube corner cavities is useful if a widened entrance angularity is desired for the sheeting, and can be used in conjunction with filling the cube corner cavities with a transparent fill material. Structured surfaces having only two intersecting ridge sets, having more than three intersecting ridge sets, or having no intersecting ridge sets but instead having non-truncated cube corner elements are also contemplated. Ridges within a given ridge set, and ridges from different ridge sets, can have different heights. The structured surface can comprise cavities that have one or more non-optical face in addition to the three mutually perpendicular cube corner faces. See, for example, U.S. Pat. No. 5,557,836 (Smith et al.) and U.S. Pat. No. 5,831,767 (Benson et al.) for cube corner pyramidal structured surfaces, negative copies of which can be used with body layers disclosed herein.

EXAMPLES 1–4

Four body layers were embossed with a mold to impart a structured surface similar to that shown in FIG. 1. The mold had a structured surface consisting of three sets of flat-bottomed grooves, and was the negative replica of a prior mold whose upper portions had been ground down flat with an abrasive. The embossed body layers were made of polycarbonate. The body layers for Examples 1 and 2 had a thickness of about 43 mils (1.1 mm) and included sufficient TiO$_2$ filler to make them opaque with a diffuse white surface appearance. Those for Examples 3 and 4 had a thickness of about 18 mils (0.46 mm) and included instead a red dye to give a diffuse red surface appearance. The structured surface of each body layer consisted essentially of three intersecting sets of parallel ridges. Two of the sets, refered to as "secondary" ridge sets, had uniform ridge spacings of about 16 mils (408 μm) and intersected each other at an included angle of about 70 degrees. The other set of parallel ridges, referred to as the "primary" ridge set, had a uniform spacing of about 14 mils (356 μm) and intersected each of the secondary ridge sets at an included angle of about 55 degrees. This produced cube corner cavity matched pairs canted at an angle of about 9.18 degrees. All of the ridges had substantially flat top surfaces whose transverse dimension was about 3.5 mils (89 μm) for the primary grooves and about 2.2 mils (56 μm) for the secondary grooves. The top surfaces were all non-smooth as a result of the abrasive action on the original mold discussed above, transferred to the body layers via the replication steps. The cube corner elements had a cube depth below the top surfaces of about 5.17 mils (131 μm). A silver film was vacuum deposited onto the structured surface of each sample to a thickness sufficient to render the film opaque yet highly reflective. For Examples 2 and 4, the portion of the silver film disposed on the top surfaces was removed by lightly sanding with an abrasive. The silver film for Examples 1 and 3 was left undisturbed and continuous.

A radiation-curable composition was prepared by combining (by weight) 74% Ebecryl 270 (a urethane acrylate available from Radcure), 25% Photomer 4127 (propoxylated neopently glycol diacrylate available from Henkel), and 1% Daracure 1173 (a photoinitiator available from Ciba-Geigy). This composition was then flow coated on the structured surface of all samples at room temperature to a thickness sufficient to fill the cube corner cavities and cover the top surfaces. The composition was flowable and had a viscosity of about 2000 centipoise (2 Pa-s) during filling. The samples were degassed at room temperature in a small vacuum chamber. Next, when no bubbles remained in the composition, the samples were removed from the chamber and covered with a 7 mil (178 μm) thick sheet of photograde PET sheeting to eliminate oxygen during subsequent curing. A heavy quartz plate having good transparency in the UV was placed on the PET sheeting and curing was then performed through the quartz plate and PET sheeting with UV light from a mercury lamp for about two minutes. The fill material composition had a sufficiently low shrinkage so that it hardened and bonded to the vapor-coated body layer. The composition did not bond to the PET sheeting, which was then removed. The cured composition was substantially clear and smooth but not permanently tacky. The sheetings so constructed all exhibited retroreflectivity. The coefficient of retroreflection was measured at a −4 degree entrance angle, 0 degree orientation angle, at both 0.2 and 0.5 degree observation angles, and have not been adjusted to take into account the proportion of the structured surface actually occupied by the cube corner elements:

| Sample No. | Body layer color | Silver film on top surfaces | Retro. Coeff. (cd/lx/m$^2$) @ 0.2° | @ 0.5° |
|---|---|---|---|---|
| 1 | White | Yes | 58 | 26 |
| 2 | White | No | 46 | 22 |
| 3 | Red | Yes | 28 | 14.6 |
| 4 | Red | No | 22 | 17 |

These measurements demonstrate that the silver film imparts a high specular reflectivity to the recessed faces. Samples 2 and 4, with the silver film exposed selectively on the recessed faces, exhibited noticeable daytime color (white or red) as a result of the exposed body layer at the top surfaces.

Figure 8:
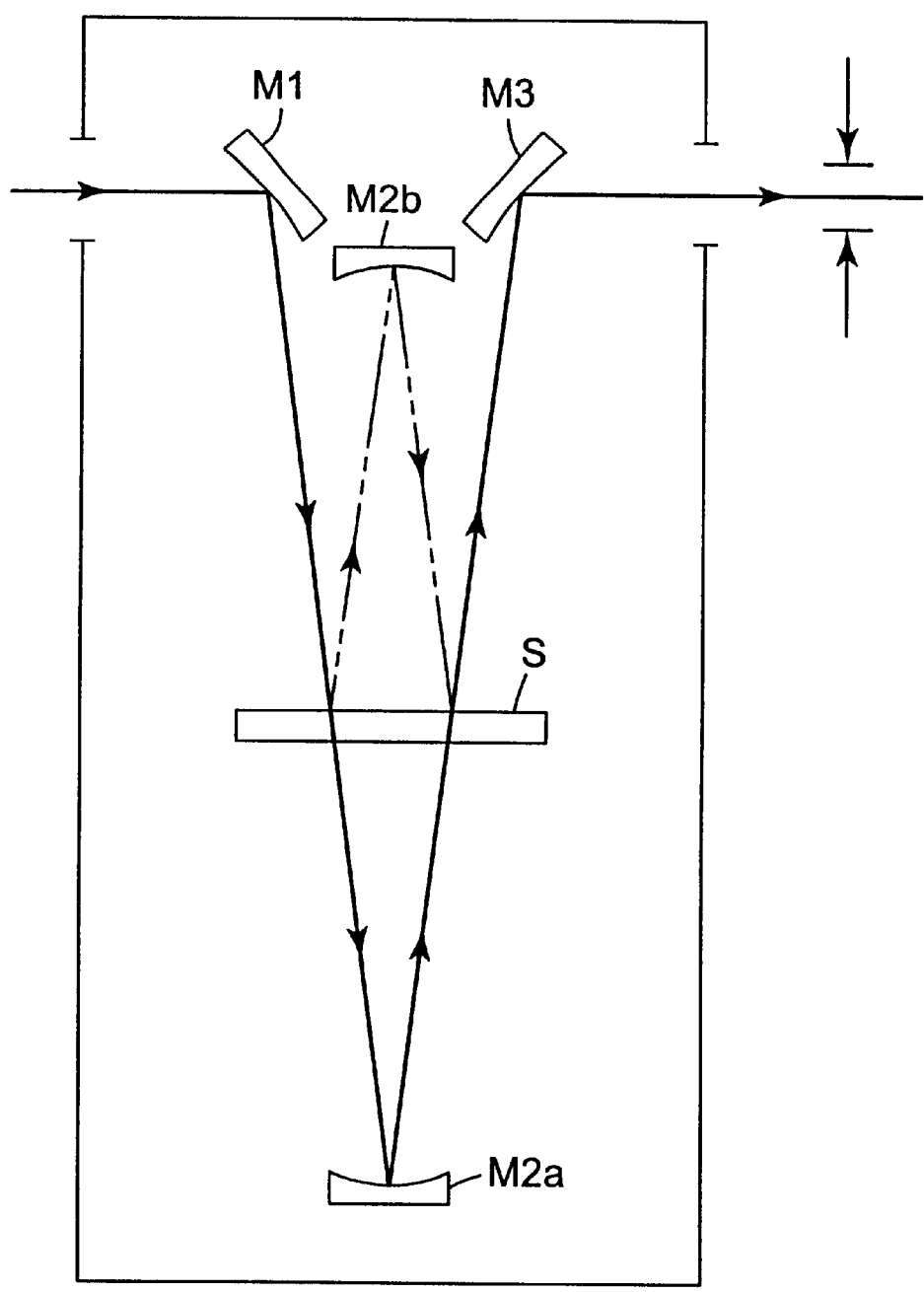
FIG. 8 is a schematic view of a portion of a setup used to measure the specular reflectivity of the top surfaces of cube corner cavity-based samples.

The specular reflectivity of the top surfaces for samples 1 and 2 was also measured. A Perkin-Elmer Lambda 900 UV/Vis/NIR spectrometer (Perkin-Elmer Corp., Norwalk, Conn.) with a PELA-1029 Absolute Specular Reflectance test accessory (Labsphere Inc., North Sutton, N.H.) was used for this purpose. This test accessory utilized a 7.5 degree angle of incidence, and had a "V" optical geometry for reference purposes and a "W" optical geometry with the sample in place. See FIG. 8, where S is the sample, M1 and M3 are fixed mirrors, and M2 is a moveable mirror having a reference position M2*a* and another position M2*b* when the sample is installed. Absolute reflectance of each sample was determined by dividing the sample measurement by the corresponding reference measurement, thus canceling out the characteristics of all the optical components other than the sample. Data was taken from 400 to 700 nm in 10 nm increments, and averaged. The square root of the raw reflectance value was taken since in the test equipment described, light reflects off the sample two times. The value thus obtained was then corrected to remove the contribution of light reflected from the air/fill material interface at the front surface of the fill material. This contribution can be calculated using the simplified Fresnel equations for normal or near-normal incidence in an air medium, $$\text{Reflectance} \approx \left(\frac{n-1}{n+1}\right)^2$$

The refractive index n of the fill material composition is known to be about 1.5 throughout the visible, yielding a contribution of about 4%. Finally, after subtracting this contribution, the value obtained is divided by the fractional area of the sample occupied by the top surfaces, which for the geometry described above was determined to be about 45.5%. This final calculated value is taken to be the specular reflectivity of the top surfaces. Using this procedure, a specular reflectivity of about 9% was calculated for Sample 1 and about 3% was calculated for Sample 2.

EXAMPLES 5–8

Samples were made to better quantify the roughening concept. Four polycarbonate body layers were made having a structured surface similar to that of FIG. 1 with three intersecting sets of parallel ridges, each ridge set having a uniform spacing of about 8.5 mils (216 μm) and each set intersecting the other two sets at 60 degrees, thus forming non-canted cube corner cavities. Each ridge had a flat top surface about 1.65 mils (42 μm) in transverse dimension, so that the top surfaces took up about 50% of the structured surface area in plan view. A flat-tipped diamond tool had been used to form the master mold from which the body layers were replicated, and as a result the top surfaces were initially optically smooth. The top surfaces of the samples were then selectively roughened by lightly rubbing the structured surface side of the body layer with different abrasives. Thereafter, the modified structured surfaces were vacuum coated with a continuous aluminum vapor coat about 100 nm thick. A layer of Nucrel brand ethylene acid copolymer resin (type 699, a heat-activated adhesive available from E. I. du Pont de Nemours and Company) was then applied as a fill material at a thickness of about 3 mils (76 μm, measured from the top surfaces of the body layer) at about 130 degrees C. to the structured surface, which hardened upon cooling. The roughness of the top surfaces and the cap-Y value of the samples were measured after filling with resin composition. For the roughness measurements, a Leica brand TCS4D Laser Scanning Confocal microscope equipped with a 20x, 0.45 NA objective, using 488 nm light was used. A topographic image of a 0.5 mm by 0.5 mm area on the structured surface was generated from a series of 20 images taken at different axial positions, and a Leica-supplied TCS roughness macro used to measure roughness. Roughness was characterized in terms of the average deviation from a plane ("Ra", expressed in units of em). The cap-Y of the samples was also measured, using a HunterLab LabScan 6000 0°/45° spectrocolorimeter. For completeness, the specular reflectivity of the top surfaces was measured using the same procedure as outlined above in connection with samples 1 and 2 (subtracting a calculated 4% reflectivity of the air/fill material interface and dividing by 0.50), and the coefficient of retroreflectivity was measured with standard equipment at a −4 degree entrance angle and a 0.2 degree observation angle. The results are given in the table below, where the listed coefficient of retroreflectivity has also been divided by 0.5 to take into account the proportion of the structured surface actually occupied by the cube corner cavities:

| Sample No. | Abrasive Used | Measurements | | | |
|---|---|---|---|---|---|
| | | Ra (μm) | Cap-Y | Specular Reflectivity (%) | Retro. Coeff. (cd/lx/m$^2$) |
| 5 | (none) | 0.12 | 5.2 | 74 | 226 |
| 6 | office paper | 0.16 | 8.2 | 54 | 66 |
| 7 | 2000 grit sandpaper | 0.59 | 30.3 | 7 | 40 |
| 8 | 400 grit sandpaper | 0.90 | 28.4 | 8 | 52 |

The table shows that making the top surfaces rough or non-smooth can substantially decrease specular reflectivity and increase the whiteness of the sheeting, even with a continuous reflective film covering the entire structured surface. A roughness value of at least about 0.15 μm, and preferably at least about 0.2 μm, is desirable for making appreciable changes to the observed cap-Y whiteness. Similarly, it is desirable to impart to the top surfaces a specular reflectivity of less than about 60%, preferably less than about 40%, and more preferably less than about 20%.

DISCUSSION

The cube corner cavities disclosed herein can be individually tailored so as to distribute light retroreflected by the articles into a desired pattern or divergence profile, in an analogous manner to that taught by U.S. Pat. No. 4,775,219 (Appledorn et al.). The faces that make up the cube corner cavities can be arranged in a repeating pattern of orientations that differ by small amounts, such as a few arc-minutes, from the orientation that would produce mutual orthogonality with the other faces of cube corner element. Typically the deviations from orthogonality are less than ±20 arc minutes and often less than ±5 arc minutes.

The body layer for retroreflective sheeting as described herein can be manufactured as an integral material, e.g. by embossing a preformed sheet with an array of cube corner elements as described above or by casting a fluid material into a mold. Alternatively, the body layer can be manufactured as a layered product by casting a layer defining the structured surface against a preformed flat film analogous to the teachings of PCT Publication No. WO 95/11464 (Benson, Jr. et al.) and U.S. Pat. No. 3,684,348 (Rowland), or by laminating a preformed film to a preformed layer having cube corner cavities. Useful body layer materials are those that are dimensionally stable, durable, weatherable, and readily formable into the desired configuration. Examples include acrylics such as Plexiglas brand resin from Rohm and Haas, thermoset acrylates and epoxy acrylates, preferably radiation cured; polycarbonates; polystyrenes; polyolefins; polyethylene-based ionomers (marketed under the name 'SURLYN'); polyesters; and cellulose acetate butyrates. Generally any material that is formable, typically under heat and pressure, can be used. The sheeting can also include colorants, dyes, UV absorbers, or other additives as desired.

Mold substrates used to make the initial structured surface, a negative copy of which is employed in the body layer, may comprise any material suitable for forming directly machined grooves or groove sets. Suitable materials should machine cleanly without burr formation, and maintain dimensional accuracy after groove formation. A variety of materials such as machinable plastics or metals can be used. Suitable plastics comprise thermoplastic or thermoset materials such as acrylics. Suitable metals include aluminum, brass, copper (soft or hard), and nickel (electroformed or electroless).

Copies of the machined master mold can be made by any suitable process, for example by electrolytic deposition of nickel, to produce positive or negative replicated molds. The replicated molds, composed of metal, plastic, or other suitable materials, can be used to emboss, cast, or otherwise form the pattern of the mold into a body layer.

GLOSSARY OF SELECTED TERMS

The "body layer" of a retroreflective sheet or article that uses a structured surface for retroreflection is the layer (or layers) possessing the structured surface and chiefly responsible for maintaining the integrity of such structured surface.

"Cube corner cavity" means a cavity bounded at least in part by three faces arranged as a cube corner element. "Cube corner element" means a set of three faces that cooperate to retroreflect light or to otherwise direct light to a desired location. "Cube corner element" also includes a set of three faces that itself does not retroreflect light or otherwise direct light to a desired location, but that if copied (in either a positive or negative sense) in a suitable substrate forms a set of three faces that does retroreflect light or otherwise direct light to a desired location.

"Cube corner pyramid" means a mass of material having at least three side faces arranged as a cube corner element.

"Cube height" or "cube depth" means, with respect to a cube corner element formed on or formable on a substrate, the maximum separation along an axis perpendicular to the substrate between portions of the cube corner element.

"Diffusely reflective", "diffuse reflectivity", and cognates thereof mean the property of reflecting a collimated incident light beam into a plurality of reflected light beams. Surfaces that are diffusely reflective also have a low specular reflectivity.

"Dihedral edge" of a cube corner element is an edge of one of the three faces of the cube corner element that adjoins one of the two other faces of the same cube corner element.

"Geometric structure" means a protrusion or cavity having a plurality of faces.

"Groove" means a cavity elongated along a groove axis and bounded at least in part by two opposed groove side surfaces.

"Groove side surface" means a surface or series of surfaces capable of being formed by drawing one or more cutting tools across a substrate in a substantially continuous linear motion. Such motion includes fly-cutting techniques where the cutting tool has a rotary motion as it advances along a substantially linear path.

"Nondihedral edge" of a cube corner element is an edge of one of the three faces of the cube corner element that is not a dihedral edge of such cube corner element.

"Retroreflective" means having the characteristic that obliquely incident incoming light is reflected in a direction antiparallel to the incident direction, or nearly so, such that an observer at or near the source of light can detect the reflected light.

"Specularly reflective", "specular reflectivity", and cognates thereof mean the property of reflecting an incident beam of light that impinges on a surface at an entrance angle $\theta$ relative to the surface normal into substantially a single reflected light beam directed along an axis (referred to as the "specular axis") lying in the plane of incidence and making an equal but opposite angle $-\theta$ with the surface normal. A recessed face (or a reflective film on such face) is said to have a high specular reflectivity if a plurality of such faces can be configured in a structured surface to yield a coefficient of retroreflection of at least about 5 cd/lux/m$^2$ at an entrance angle $\beta=-4$ degrees and at an observation angle $\alpha=0.2$ degrees, such coefficient of retroreflection taking into account the proportion of the structured surface actually occupied by the cube corner elements. Top surfaces (or films or other substances thereon) are said to have a low specular reflectivity if they reflect less than about 60% of light incident thereon along the specular axis, taking into account the proportion of the structured surface actually occupied by the top surfaces. In measuring high and low specular reflectivity, both recessed faces and top surfaces are typically illuminated; the contribution of the top surfaces is typically negligible in the former case and the contribution of the recessed faces (along the specular axis) is arranged to be negligible in the later case by proper selection of test geometry.

"Structured" when used in connection with a surface means a surface composed of a plurality of distinct faces arranged at various orientations.

"Symmetry axis" when used in connection with a cube corner element refers to the axis that extends through the cube corner apex and forms an equal angle with the three faces of the cube corner element. It is also sometimes referred to as the optical axis of the cube corner element.

"Top surfaces" of a structured surface that also contains recessed faces refers to surfaces that are distinct from the recessed faces and that have a minimum width in plan view of at least about 0.0001 inches (2.5 $\mu$m).

All patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A cube corner article, comprising:
   a body layer having a structured surface comprising recessed faces and top surfaces, wherein the top surfaces have a width, and the recessed faces defining cube corner cavities; and
   a film of reflective material exposed selectively on the recessed faces of the structured surface.

2. The article of claim 1, wherein the film is substantially continuous.

3. The article of claim 2, further comprising:
   a masking material disposed selectively on the top surfaces and covering the film.

4. The article of claim 3, wherein the masking material is diffusely reflective.

5. The article of claim 4, wherein the masking material is substantially white.

6. The article of claim 3, wherein the masking material is substantially opaque.

7. The article of claim 1, wherein the film is discontinuous.

8. The article of claim 7, wherein the film is substantially absent from at least some of the top surfaces.

9. The article of claim 8, wherein the film is substantially absent from all of the top surfaces, and the structured surface consists essentially of the recessed faces and the top surfaces.

10. The article of claim 8, wherein the body layer is exposed at the at least some of the top surfaces, the body layer comprising a diffusely reflective material.

11. The article of claim 7, wherein the body layer is transparent.

12. The article of claim 7, wherein the reflective material comprises silver.

13. The article of claim 1, wherein the structured surface comprises intersecting sets of parallel ridges.

14. The article of claim 13, wherein the ridges within at least one of the sets of parallel ridges have upper portions with differing transverse dimensions.

15. The article of claim 14, wherein the upper portions of ridges for at least two of the sets of parallel ridges have differing transverse dimensions.

16. The article of claim 1, wherein the cube corner cavities comprise cube corner cavities of differing aperture size.

17. The article of claim 1, further comprising: a substantially transparent cover layer that covers the structured surface.

18. The article of claim 1, further comprising: an adhesive applied to a rear surface of the body layer.

* * * * *

UNITED STATES PATENT AND TRADEMARK OFFICE
CERTIFICATE OF CORRECTION

PATENT NO. : 6,287,670 B1
DATED : September 11, 2001
INVENTOR(S) : Benson, Gerald M.

It is certified that error appears in the above-identified patent and that said Letters Patent is hereby corrected as shown below:

Column 3,
Line 65, delete "comer" and insert in place thereof -- corner --.

Column 8,
Line 11, delete "og" and insert in place thereof -- of --.
Lines 15-16, delete "Film 64 covers both recessed faces 54 and top surfaces 56.".

Column 13,
Line 26, delete "em)." and insert in place thereof -- µm). --.

Signed and Sealed this

Nineteenth Day of August, 2003

JAMES E. ROGAN
*Director of the United States Patent and Trademark Office*